Sept. 4, 1956  W. WAGNER  2,761,463
TWO-WAY CHECK VALVE
Filed Dec. 17, 1953
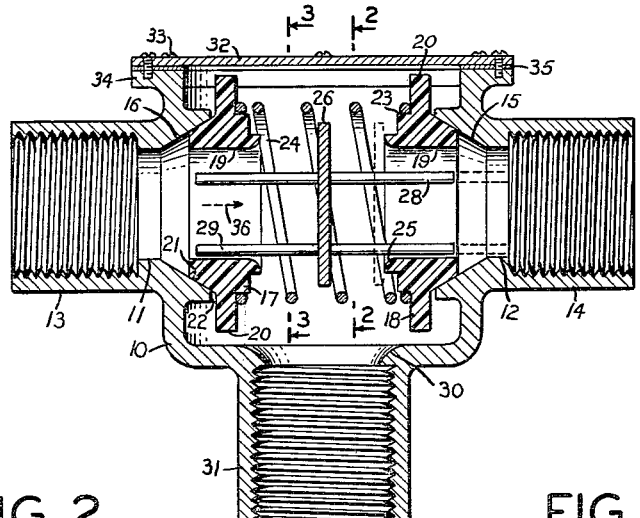
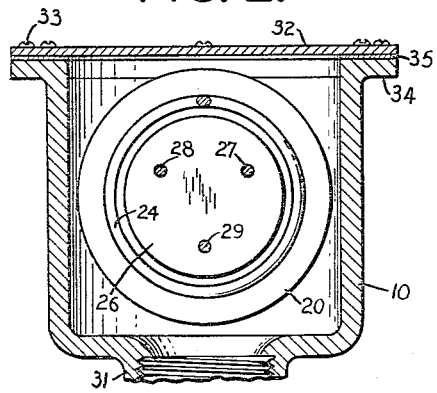
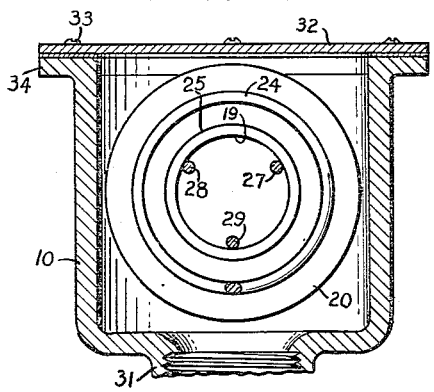
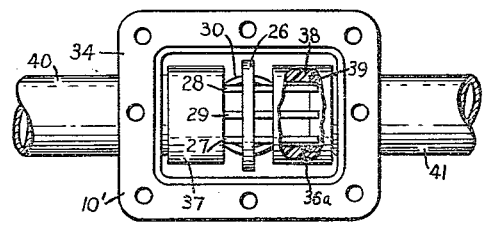
INVENTOR
WILLIAM WAGNER
BY
ATTORNEY

United States Patent Office 2,761,463
Patented Sept. 4, 1956

2,761,463

TWO-WAY CHECK VALVE

William Wagner, Brooklyn, N. Y.

Application December 17, 1953, Serial No. 398,789

5 Claims. (Cl. 137—112)

The present invention relates to a new and improved two-way check valve.

The need has long existed for a check valve usable in air conditioning, heating, and other fluid flow systems, capable of admitting fluid into either of two inlet ports and directing flow out of a third port while preventing fluid flow into one of the other inlet ports. In such valves as have been heretofore provided the housings for the several parts have been of a unitary construction so that access to the interior parts has been very limited being confined to only the several inlet and outlet ports. These prior valves have also included parts of complicated shapes, and have been very much subject to wear and frequent failure in operation.

The present invention overcomes all the difficulties inherent in valves heretofore provided for similar purposes. Basically the structure embodying the present invention consists of a housing having two inlet ports and an outlet port. The housing is also provided with a removable wall which permits access to the interior of the valve. A pair of valve seals are located in the housing at the inlet ports and are held in place by a coil spring. A check member is supported on rod-like members which are guided in movement by the valve seals under the impulse of fluid flowing into one or the other of the inlet ports. All ports are provided with internally threaded bores for engaging correspondingly threaded conduits.

It is therefore a principal object of the invention to provide a novel two-way check valve which is simplified in construction yet more satisfactory in operation than prior known valves.

It is a further object to provide a two-way check valve which is more readily serviced and repaired than prior known valves.

Other and further objects and advantages of the invention will become apparent from the following description taken together with the drawing, wherein:

Fig. 1 is an elevational sectional view of the valve embodying the invention.

Fig. 2 is a section taken on lines 2—2 of Fig. 1.

Fig. 3 is a sectional view taken on lines 3—3 of Fig. 2.

Fig. 4 is a plan view of a valve embodying a modification of the invention.

In Figs. 1, 2 and 3 are shown the housing 10 which is generally rectangular in shape provided with two inlet ports 11, 12 axially aligned and disposed at opposite sides of the housing. The several ports are provided with internally threaded bores 13, 14 integrally formed with the housing 10. Each of the inlet ports terminates in a tapered seat 15 and 16 respectively. A unique sealing member is provided for each inlet port. The seals 17 and 18 are identical cylindrical members. Each has an opening 19 aligned axially with the ports 11, 12. The outer sides of the seals are tapered to provide sealing surfaces 21 which seat in the tapered seats 15, 16 of the inlet ports. A flange 20 is provided to seat on and seal the bearing surface 22 of each of valve seats 15, 16.

A stepped portion 23 is provided on the outer side of each sealing member on which is engageable the spring 24. The inner end of each opening 19 of the sealing members has an outwardly flared portion 25. It is intended that the slidable check member 26 seat on and seal the said flared portions 25 when the valve is in operation as will be described later. The coil spring 24 engages the stepped portions 23 as above mentioned and serves to hold the sealing members in engagement with the ports 11, 12 with the tapered seats 15, 16 in firm contact with tapered walls 21 of the sealing members. Check member 26 is a flat disc through which pass three equally spaced rods or guide elements 27, 28, 29 which define a frame. The guide members are so spaced that they project snugly into the openings 19 of the sealing members and contact the walls with a smooth sliding fit, so that the check member 26 is movable from side to side parallel to the axes of the inlet ports and sealing members.

An outlet port 30 is located at the lower end of the housing 10 and is provided with an internally threaded bore 31 for engaging a correspondingly threaded outlet conduit. A flat cover plate 32 is provided for the open top of housing 10. The top of the housing has outwardly extending flanges 34 in which are threaded the several screws 33 which secure the cover plate to the housing. A gasket 35 may be provided between the cover plate and flanges 34. The housing 10 may be cast or forged of brass, bronze, or other suitable metal. The sealing members 17, 18 are preferably made of a tough, long wearing resilient material such as nylon, the tetrafluoroethylene resin known as teflon or the like. The cover plate and check member are preferably made of brass. Guides 27, 28, 29 should be of high quality stainless steel and the spring 24 is preferably of stainless steel music wire. Gasket 35 may be of any suitable tough resilient material.

In operation liquid or gas from a heat pump, refrigeration system, space heater, air conditioner or the like supplies an appropriate fluid through the inlet port 11 or 12 into the interior of the valve. If fluid flow is as shown by the arrow 36 through the port 11, then the pressure of fluid will move the check member 26 to the dotted line position A sealing the port 12 by firmly contacting the flared portion 25 of the sealing member 18. The check member is guided in movement by the rods 27, 28, 29 which move to the dotted line position shown in Fig. 1. By this means fluid from one inlet port cannot enter the other inlet port but must leave by the outlet port 30. When fluid flow through port 11 ceases and fluid flow begins through port 12 then the check member moves to close the port 11. In those applications where it is desired to pass fluid alternately through one inlet port or the other and occasionally in through both inlet ports together, the present valve is particularly useful since check member will assume an intermediate position when fluid flow occurs in through both inlet ports together but will operate to close one port when fluid flows in through the other inlet port. In all cases fluid flow will be out through the outlet port 30.

In Fig. 4 is shown a modification of the invention. The sealing member 37 as provided in this modification has a smooth cylindrical outer wall. The inner wall 38 has a stepped portion 36a which abuts the flat end 39 of conduit 40. Each of conduits 40 are rigidly secured in the housing 10' and project into the interior of the valve. In the present modification sealing members 37 are formed of a tough but resilient material so that they grip the ends 39 of the conduits 40, 41 and do not require a holding spring as employed in the embodiment of Fig. 1.

The operation of the modification of Fig. 4 is similar to that of Fig. 1. Fluid flowing into the valve through either inlet conduit 40, 41 passes out through the outlet 30. The guide members 27—29 slide in the ends 39 of the conduits until the check member 26 firmly seats against the flat side of the sealing member 37 of the conduit into which no fluid is desired to enter. The structure of Fig. 4 is somewhat simpler than that of Fig. 1 and employs fewer parts but for the most part it will operate in the same manner as the structure of Fig. 1.

It will be noted that the valves of Figs. 1 and 4 both include the cover plate 32. This is a very important feature of the invention since it makes possible disassembly of the valve and repair or replacement of the several parts without disconnecting the valve housing from the conduits joined to the housing. Also, the valve housing and connecting parts may be brazed and other work may be done to them without causing damage to the inner assembly by simply removing the inner assembly before the work is done.

Although a limited number of embodiments of the invention have been described, it will be apparent to those skilled in the art that many changes are possible which will constitute the full equivalents of the several features disclosed. It is therefore desired that the invention be limited only by the scope of the following claims.

I claim:

1. A two-way check valve, comprising a housing having three ports, a valve chamber in said housing communicating with all three ports, a pair of annular valve seats in said chamber situated opposite each other at two of said ports, a frame mounted in said valve chamber with one end in one of said valve seats and the other end in the other valve seat, said frame being slidably movable longitudinally of itself in either direction, and a valve closure member mounted on said frame intermediate its ends, said valve closure member being engageable with one of said valve seats to close its adjacent port when the frame is moved in one direction, said valve closure member being engageable with the other valve seat to close the port adjacent said other valve seat when the frame is moved in the opposite direction, said valve seats constituting a pair of removable inserts and said valve housing having an opening formed therein through which said valve seats are removable, said slidable frame with its valve closure member mounted thereon being also removable through said opening, and a cover being provided to close said opening.

2. A two-way check valve in accordance with claim 1, wherein a compression spring is disposed between the two valve seats, one end bearing against one valve seat and the other end bearing against the other valve seat, to hold them in place.

3. A two-way check valve in accordance with claim 1, wherein annular shoulders are provided at the two ports where the valve seats are situated, said valve seats having tubular portions which fit onto said annular shoulders to hold the valve seats in place relative to said ports.

4. A two-way check valve in accordance with claim 1, wherein the ports at which the valve seats are situated are provided with tapered, annular shoulders, said valve seats being provided with tapered annular portions which fit into said annular shoulders, said valve seat being also provided with annular flanges, said valve seats and their respective tapered annular portions and annular flanges being all concentric with each other, and a compression spring which is disposed between the two annular seats, said spring bearing at one end against the annular flange of one of said valve seats and bearing at the opposite end against the annular flange on the other valve seat, whereby the two valve seats are tensionally held in place with their respective tapered annular portions seated in the tapered annular shoulders of said last mentioned ports.

5. A two-way check valve in accordance with claim 1, wherein the frame comprises a plurality of parallel rods which are situated parallel to the central axis of the valve closure member and equidistant therefrom, said rods being adapted to bear against the inner surfaces of said valve seats to support the valve closure member in operative position relative to said valve seats.

References Cited in the file of this patent

UNITED STATES PATENTS

| | | |
|---|---|---|
| 2,381,484 | Blank | Aug. 7, 1945 |
| 2,386,585 | Blank | Oct. 9, 1945 |
| 2,634,743 | Audemar | Apr. 14, 1953 |